(12) United States Patent
Rigazzi

(10) Patent No.: US 6,821,113 B2
(45) Date of Patent: Nov. 23, 2004

(54) PRECOMBUSTION CHAMBER FOR AN IC ENGINE AND ELECTRODE ASSEMBLY FOR PRODUCING COMBUSTION IN ONE PART OF THE PRECOMBUSTION CHAMBER

(75) Inventor: Pier Andrea Rigazzi, Agno (CH)

(73) Assignee: Dauber Holdings Inc., Panama (PA)

( * ) Notice: Subject to any disclaimer, the term of this patent is extended or adjusted under 35 U.S.C. 154(b) by 5 days.

(21) Appl. No.: 10/240,095

(22) PCT Filed: Mar. 26, 2001

(86) PCT No.: PCT/IB01/00483
§ 371 (c)(1),
(2), (4) Date: Sep. 27, 2002

(87) PCT Pub. No.: WO01/73276
PCT Pub. Date: Oct. 4, 2001

(65) Prior Publication Data
US 2003/0054310 A1 Mar. 20, 2003

(30) Foreign Application Priority Data
Mar. 31, 2000 (CH) ............................... 627/00
Apr. 25, 2000 (CH) ............................... 804/00
Dec. 21, 2000 (CH) ............................... 2498/00

(51) Int. Cl.$^7$ ............................................ F02B 19/12
(52) U.S. Cl. .................. 431/264; 60/39.826; 123/263
(58) Field of Search ................................ 431/264–266, 431/158; 60/39.826; 123/260, 263

(56) References Cited

U.S. PATENT DOCUMENTS

| | | | |
|---|---|---|---|
| 2,412,655 A | * 12/1946 | Shannon | ................ 431/266 |
| 3,563,683 A | * 2/1971 | Hess | ....................... 431/160 |
| 4,442,807 A | 4/1984 | Latsch et al. | |
| 4,926,818 A | 5/1990 | Oppenheim et al. | |
| 4,970,427 A | 11/1990 | Scharnweber et al. | |
| 6,161,516 A | * 12/2000 | Rigazzi | ...................... 123/261 |

FOREIGN PATENT DOCUMENTS

| | | | |
|---|---|---|---|
| FR | 2 743 109 | 7/1997 | |
| FR | 2743109 A1 | * 7/1997 | ........... F02B/19/12 |
| WO | 98 20240 | 5/1998 | |

\* cited by examiner

Primary Examiner—Ira S. Lazarus
Assistant Examiner—James G. Barrow
(74) Attorney, Agent, or Firm—Young & Thompson

(57) ABSTRACT

An assembly includes a precombustion chamber and electrode, for producing the ignition and combustion of a fuel while maintaining the flame temperature below a predetermined value, and keeping the flame front (F) in the proximity of an aperture of the precombustion chamber which opens into one or more cylinders. The fuel is injected towards the aperture of the precombustion chamber by an injector having its injection nozzle located within the closed rear end of the precombustion chamber opposite the aperture. The electrode has the shape of a solid of revolution and is positioned coaxially with respect to the aperture within the part of the precombustion chamber which terminates at the aperture, and has an axial length (L) such that, at any instant, the aforesaid flame front (F) generated by the combustion is always in contact with the electrode.

10 Claims, 3 Drawing Sheets

SECT. B-B

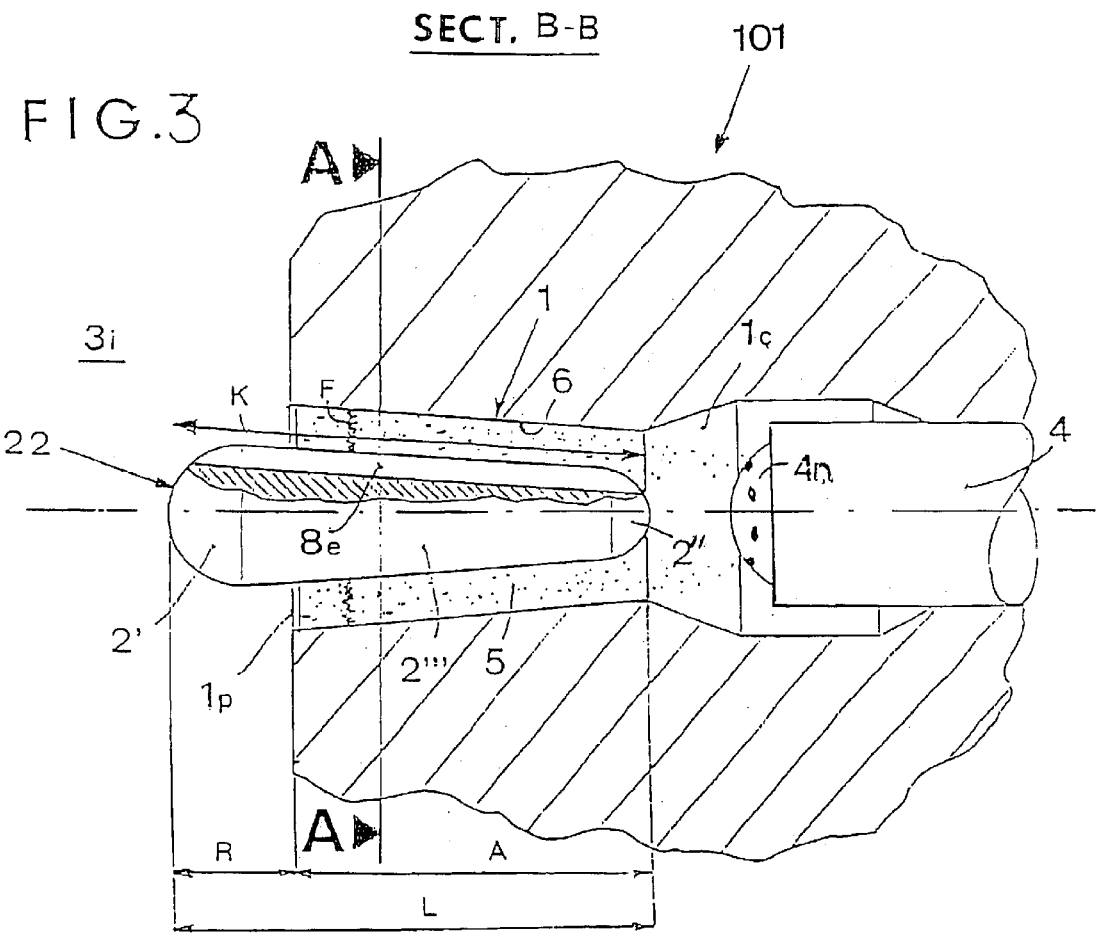
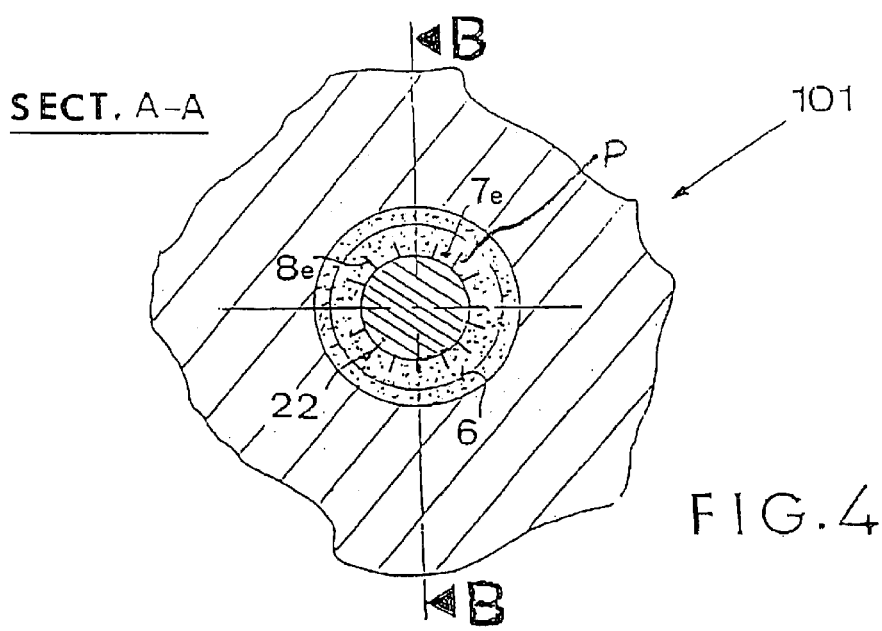

PRECOMBUSTION CHAMBER FOR AN IC ENGINE AND ELECTRODE ASSEMBLY FOR PRODUCING COMBUSTION IN ONE PART OF THE PRECOMBUSTION CHAMBER

DESCRIPTION

Background of the Invention

The present invention relates to fields of engineering which make use of the combustion of fuels in reciprocating piston engines, whether these are of the linear type with free pistons or of the crank mechanism type with crankshafts.

More particularly, the present invention relates to engines which use a new combustion process, described by the present inventor in Patent Application PCT/TB 97/01362, which is carried out within one or more precombustion chambers opening into the cylinders, exploiting the dynamics of the expansion of the gases contained in them to keep the flame fronts generated by the combustion practically fixed, in other words, in practice, to allow the flame fronts to move only a few tens of millimeters from the points of ignition, which are located near the apertures through which the said precombustion chambers open, as stated, into the corresponding cylinders, which can be continuations of each other in the case of internal combustion linear generators, or adjacent to each other as is usually the case in engines with crankshafts.

DESCRIPTION OF THE RELATED ART

The combustion process described above has the principal object and advantage of causing combustion to take place in such a way that the flame temperature remains sufficiently low at all points, to reduce the formation of nitrogen oxides to a minimum.

To keep the flame in the desired conditions, the inventor has proposed, in the aforementioned patent application, that the electrode be maintained in a coaxial position at the opening of the corresponding process, to form a baffle of the desired thickness which acts as a thermal flywheel for the flame which passes through it at speed, using various apertures formed in it, the flame being formed and expelled from the precombustion chamber as a result of the expansion of the gases (fuel and air mixtures) contained separately in the precombustion chamber.

However, investigations and tests carried out in this area have revealed limits on the shape and arrangement of the parts of a precombustion chamber and electrode system as described above, since, owing to the form of the gas expansion curve, an electrode in the form of a baffle is suitable for its purpose within a relatively limited period, in which the flame front is essentially fixed.

Moreover, in the case of a precombustion chamber with an aperture of limited diameter (less than 18 mm for example), there is a risk that the temperature of the flame in the shape of a cylindrical ring which develops in the cylinder or cylinders may exceed the predetermined limit in some areas, because of the exchange of heat between opposite areas of the ring.

SUMMARY OF THE INVENTION

To avoid all these problems, while achieving the desired object of maintaining the flame temperature conveniently low at all points, but allowing the flame front to move to a significant extent, if necessary, with respect to the aperture of the precombustion chamber, and keeping the charge of mixture confined without the occurrence of any undesired dilution in any of its areas as a result of excessive turbulence, the inventor of the present solution has devised a precombustion chamber and electrode assembly in which the electrode has the shape of a solid of revolution, contained coaxially in the part of the precombustion chamber which is saturated with the fuel, which has a longitudinal extension such that, throughout the period in which the combustion takes place, the said flame front, while moving as a result of the dynamics of the gases, always remains in contact with the electrode.

The subject of the present invention is a precombustion chamber and electrode assembly as described below. A more detailed description of some preferred examples of embodiments of an assembly according to the invention will now be given; these examples are not to be considered restrictive or limiting in respect of other embodiments which may be produced by a person skilled in the art.

BRIEF DESCRIPTION OF THE DRAWINGS

In the course of the said description, reference will also be made to the attached drawings, which show:

in FIGS. 3 and 4, the assembly as shown in the preceding figures, but with an electrode on which longitudinal fins are formed;

DESCRIPTION OF THE PREFERRED EMBODIMENTS

Figure 1:
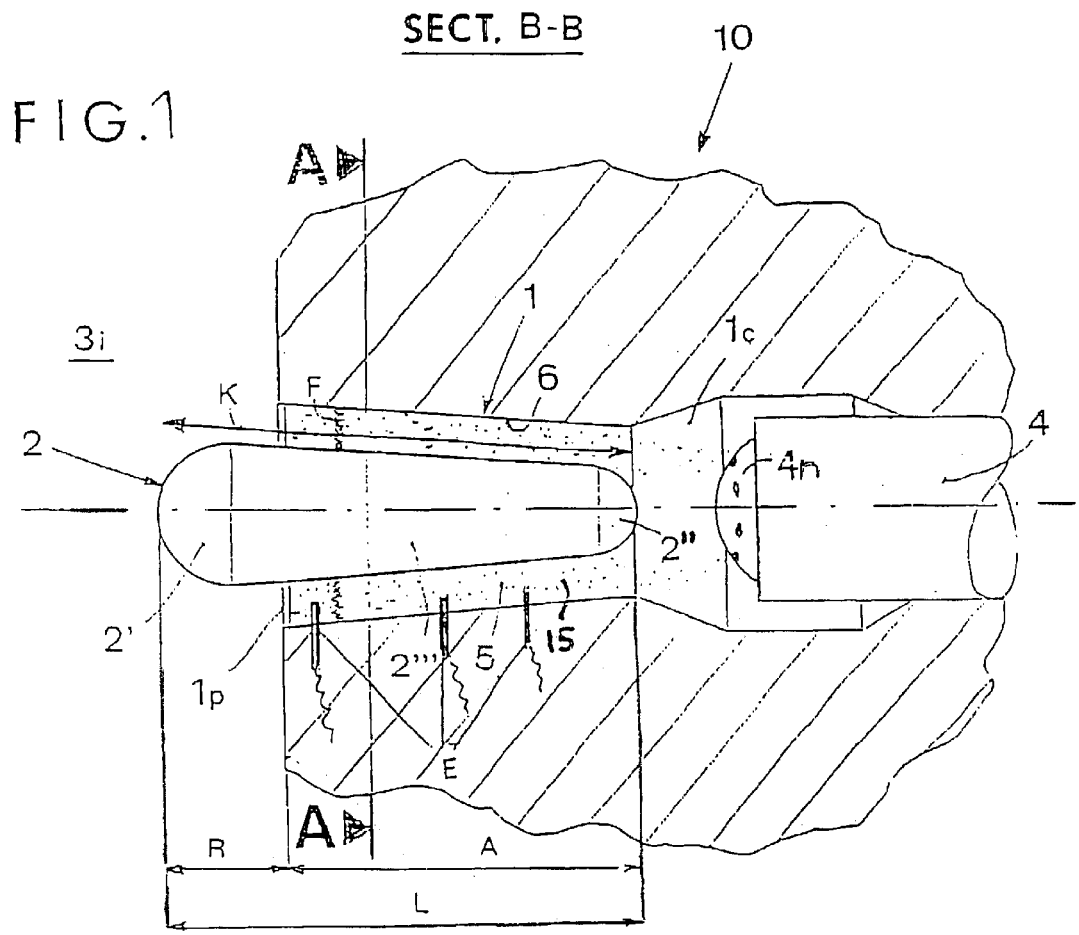
in FIG. 1, a longitudinal section through an example of embodiment of the assembly according to the invention, in which both the central body of the electrode and the part of the precombustion chamber housing it are of conical shape.
Figure 2:
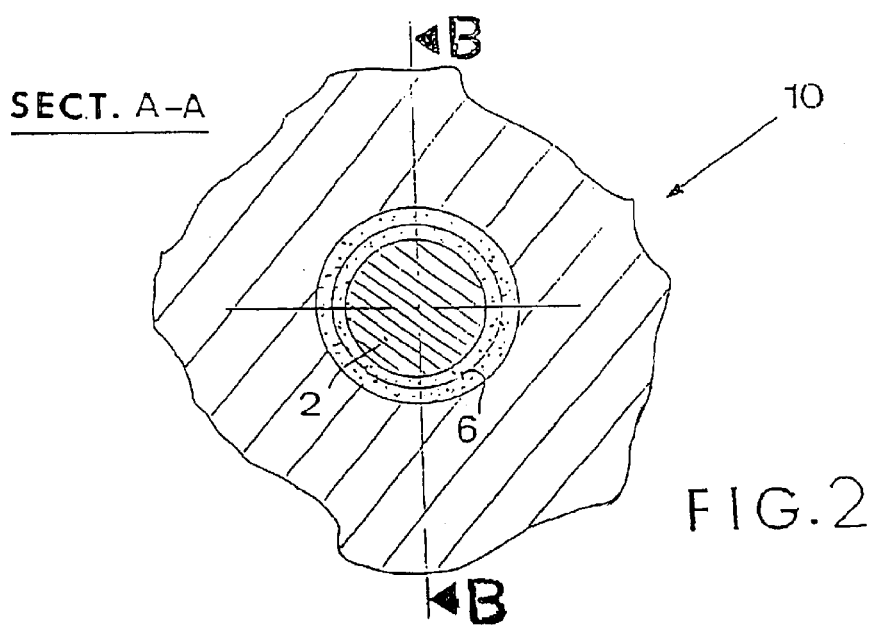
in FIG. 2, a cross section of the assembly of FIG. 1.

With reference initially to FIGS. 1 and 2, these show that, in an assembly 10 according to the invention, a precombustion chamber 1, which opens into a cylinder or a plurality of opposing cylinders 3$i$ through an aperture 1$p$, consists, as has been stated, of one part which coaxially houses an electrode 2, into which part the fuel 5 is injected, and another part, located at its closed end 1$c$, into which fuel is not injected.

The fuel 5 is injected by an injector 4 which has its injection nozzle 4$n$ located within the said part located at the closed end of the precombustion chamber 1.

The electrode 2 consists of a central body 2''' which has two ends 2', 2'' connected to it, and which can be cylindrical (this case is not shown) or conical as illustrated in FIG. 1, and is inserted coaxially into the precombustion chamber 1 in such a way as to leave an annular passage 6 of practically uniform width between the electrode and the inner walls of the precombustion chamber 1, which is therefore also cylindrical (this case is not shown) or conical as shown in FIG. 1.

The conical shape of the precombustion chamber and electrode has proved to be more suitable for the use of multiple-form injectors of the bell-shaped jet type, which generate a cone of droplets which it is easier to distribute uniformly within the resulting passage.

The electrode 2, for which the inventor proposes that ends 2', 2'' of rounded shape be made (in the form of spherical caps, for example) and joined to its central body 2''', has a total length L such that the flame front F, moving at a resultant velocity which is the vector sum of the velocity of combustion of the fuel 5 and the velocity of the outflow of the expanding gases through the passage 6 (as indicated by the arrows of double arrow-headed line K), is always in contact with the electrode 2.

For this purpose, depending on the geometry of the internal combustion engine and of the precombustion chamber, and depending on the duration of combustion, it may be convenient to form the electrode 2 of length L so that it consists of a first part with a length A located within the precombustion chamber 1 and a second part with a length B located outside it, in such a way that the electrode 2 can "accompany" the flame front F even when it moves outside the precombustion chamber 1.

As mentioned above, the said second part with a length B also acts, in the case of a precombustion chamber aperture 1p of small diameter (less than 18 mm for example), as a flame divider between the opposite walls of the cylindrical ring formed by the flame emerging into the cylinders 3i, thus preventing undesired temperature increases at any of its points.

It should be pointed out that, where mixtures of organic or fossil fuels (and particularly petrol fuels) are to be burnt, the inventor proposes that the assembly according to the invention be made with the passage 6 described above having a uniform width of approximately 6–8 mm.

To increase the area of the net cross section of the passage without causing temperature increases above a predetermined threshold, the inventor also provides for the possibility of forming on the outer surface of the electrode 22, as shown in FIGS. 3 and 4, in another embodiment 101 of the assembly, a plurality of scores or grooves, shaped in such a way as to form the same number of parallel fins 8e, arranged longitudinally, which serve to increase the heat-exchange surface between the flame and the electrode 2.

To form the aforesaid fins 8e, it is possible to form grooves 7e having a depth P of approximately 2 mm without causing significant temperature increases, while practically doubling the energy per cycle obtainable from the combustion of a mixture which occupies a given axial length of the passage 15, and therefore increasing the specific horsepower and the overall efficiency of the engine or generator.

The spacing between the bases of the said fins 8e is calculated according to the type of fuel and the temperature of the corresponding flame.

In the case of petrol, this spacing can be approximately 1.5 mm.

The combustion velocity of the mixture contained in the annular passage 6 described above has an effect on the thermodynamic efficiency of the internal combustion unit, which increases with a rise in this velocity.

Because of the limited width of the said passage 6 (6–8 mm), it is necessary to prevent the gases generated by combustion, which expand in the passage in a practically laminar way, from carrying, in the course of combustion, a non-turbulent flame front, which would move relatively slowly, giving rise to excessively slow combustion. To increase the combustion velocity of the mixture, the inventor proposes that the turbulence within the passage 6 be increased, using for this purpose suitable means 9d, 9e in the proximity of the aperture 1p of the precombustion chamber 1 and in the area of the rear end of the electrode 2. (See FIGS. 5 and 6).

These means 9d, 9e, which can be considered as flow deflectors, are effective because, if there is a delay, of one millisecond for example, before the instant of ignition, or before the piston (or pistons) reach the end of the compression stroke, the air enters the precombustion chamber 1 through its aperture 1p at a velocity of several meters per second, and this velocity cannot decrease significantly as a result of inertia within a period of only one millisecond.

Consequently these flow deflector means generate vortices in the passage 6, and these vortices persist during the initial instants of combustion, initiating a turbulence which is then amplified by the processes of heat transmission and propagation of the flame front.

Similarly, in the successive instants in which combustion proceeds, the air contained in the rear part 1c of the precombustion chamber 1 expands and also penetrates into the passage 6, moving towards the aperture 1p at increasing velocities, which may reach 50–60 m/s.

The said flow deflector means 9e, if fitted as stated in the area in which the rear part of the electrode 2 terminates, have the effect of producing an additional vertical motion in the passage 6 during the combustion of the fuel mixture 5, with a direction opposite to that of the motion described previously, with favourable effects of a further increase in the velocity of propagation of the flame.

The said means 9d, 9e for creating turbulence can be of various types known to those skilled in the art of fluid dynamics.

For a particular embodiment of an assembly 102 according to the invention, the inventor proposes, among others, a solution (see FIGS. 5 and 6) in which inclined grooves $20_e$, $21_e$ are formed, and face each other in a staggered arrangement, on the central body 2''' of the electrode, in the proximity of the aperture 1p of the precombustion chamber 1, and on the inner wall of the precombustion chamber in the same area.

Similarly, other grooves $23_e$, $24_e$ arranged as described above can be formed on the terminal part of the electrode 2 and on the inner wall of the rear part 1c of the precombustion chamber 1.

Figure 5:
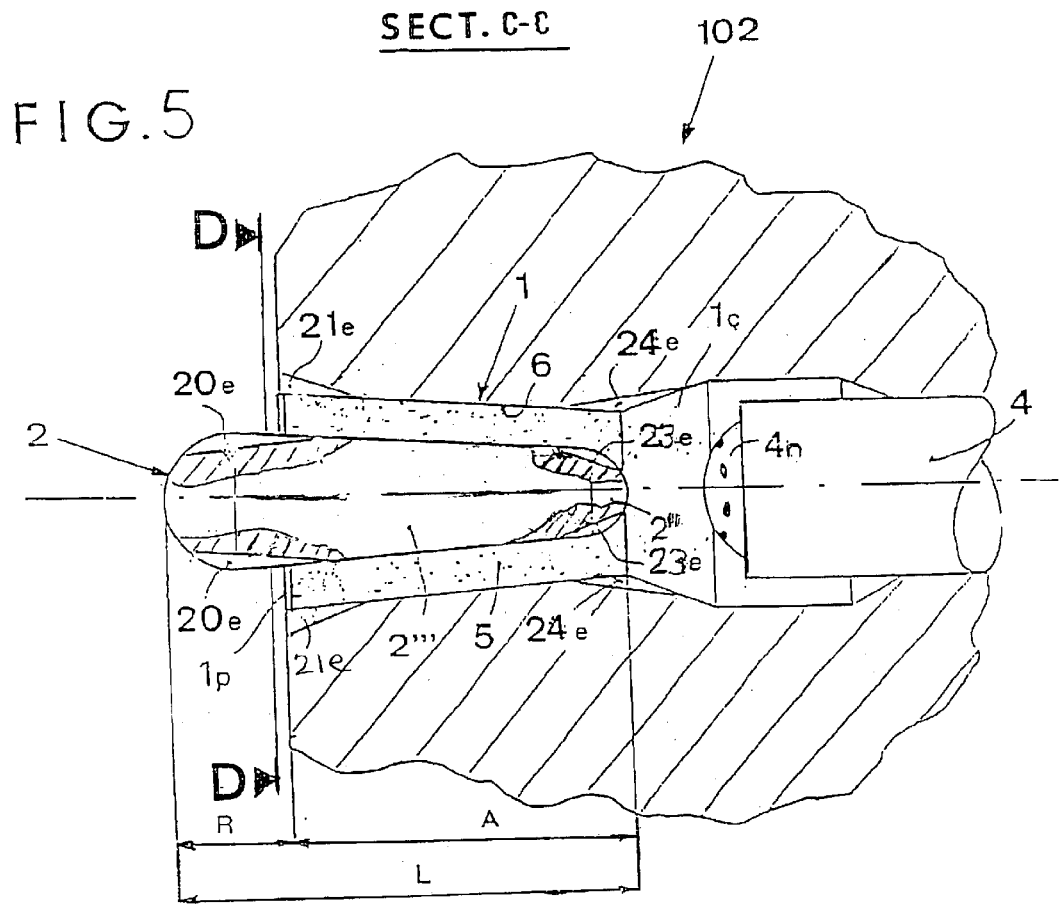
in FIG. 5, an enlarged longitudinal section through an assembly according to the invention in which means are applied to increase the turbulence in the passage.
Figure 6:
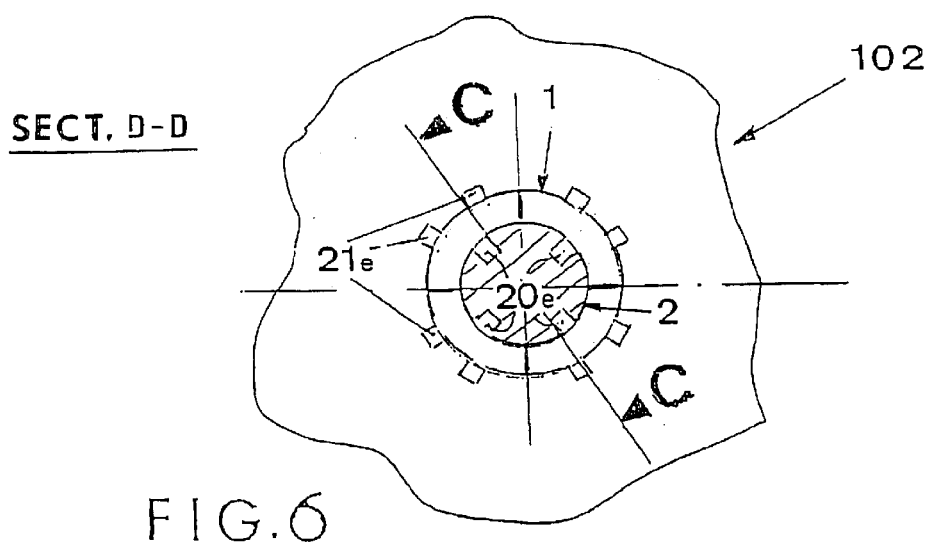
in FIG. 6, a cross section of the assembly of FIG. 5.

The inventor proposes that each pair of facing grooves be formed from grooves having lengths and inclinations differing from the axis of the precombustion chamber 1, as shown in FIGS. 5 and 6, to promote the formation of vortices.

The profiles of the bases of the grooves can be rectilinear or can have curved portions.

By using the said flow deflector means, velocities of propagation of the flame front in the range from 10 to 20 meters per second are achieved, with consequent beneficial effects on the efficiency of the thermodynamic cycle of the internal combustion unit.

The use of the means in question is found to be particularly advantageous with electrodes 2 not having the fins 8e described in the present text.

When the amount of energy produced in a cycle, or in other words, ultimately, the power generated by the reciprocating engine, is to be varied, the fuel has to be injected in different conditions (duration or pressure of injection), such that volumes of mixture of suitable richness are generated and occupy lengths of the said passage 6 which are less than the total length A of the part of the passage contained within the precombustion chamber 1 (FIG. 1), and are positioned in any way, in other words terminate and/or start at different distances from the ends of the passage 6. In order to provide efficient combustion of these volumes of mixture having different lengths and positioned in any way, the inventor proposes that a plurality of ignition points E, or a plurality of sets of these arranged in a cross formation (three in FIG. 1), be fitted along the axis of the electrode 2, so that the combustion of the mixture can be initiated at the most convenient point to make the flame front as stationary as possible with respect to the aperture 1p of the precombustion chamber 1. This result is achieved by selectively causing the generation of an electrical arc between one of these ignition points E and the electrode 2.

If required by the combustion procedures, it is also possible to generate simultaneously or in succession a plurality of arcs originating from a plurality of ignition points, thus providing a higher combustion velocity even without the use of the fins and flow deflectors described above, and increasing the thermodynamic efficiency of the cycle, which in this case becomes very similar to a typical Otto cycle.

What is claimed is:

1. Assembly (10, 101) comprising a precombustion chamber (1) and electrode (2, 22) for producing the ignition and combustion of a fuel (5) while maintaining the flame temperature below a predetermined value, and keeping the flame front (F) in the proximity of an aperture (1p) of the precombustion chamber (1) which opens into one or more cylinders (3i), this fuel (5) being injected towards said aperture (1p) of the precombustion chamber (1) by an injector (4) having its injection nozzle (4n) located within the closed rear end (1c) of the precombustion chamber (1) opposite the aforesaid aperture (1p), the said electrode (2, 22) having the shape of a solid of revolution and being positioned coaxially with respect to said aperture (1p) within the part of the precombustion chamber (1) which terminates at the aperture (1p), and having an axial length (L) such that, at any instant, the aforesaid flame front (F) generated by the combustion is always in contact with the electrode (2, 22), characterized in that a plurality of ignition points (E), or a plurality of sets of these, face said electrode (2) at a plurality of positions located at different distances from the ends of the passage (6).

2. Assembly according to claim 1, in which the ends (2', 2") of said electrode (2, 22) in the shape of a solid of revolution are in the form of rounded caps joined to its central body (2''').

3. Assembly according to claim 1, in which both said central body (2''') of the electrode (2,22) and said part of the precombustion chamber (1) which contains the electrode (2,22) coaxially within it are of essentially cylindrical shape.

4. Assembly according to claim 1, in which both said central body (2''') of the electrode (2, 22) and said part of the precombustion chamber (1) which contains the electrode coaxially within it are of essentially conical shape.

5. Assembly according to claim 1, in which said electrode (2,22) of length (L) consists of a first part with a length (A) located inside the precombustion chamber (1) and a second part with a length (B) located outside the precombustion chamber (1), in the cylinder or cylinders 3i, the sum of the lengths (A, B) of the said first and second part being equal to said length (L) of the electrode (2,22).

6. Assembly according to claim 1, in which the annular passage (6) between the electrode (2,22) and the inner wall of the precombustion chamber (1) has a width of approximately 6–8 mm.

7. Assembly according to claim 1, in which a plurality of scores or grooves (7e), capable of generating a plurality of parallel and longitudinally arranged fins (8e), is formed on the outer surface of the electrode (22).

8. Assembly according to claim 1, to which are applied flow deflector means (9d, 9e), positioned and shaped in such a way as to increase the turbulence of the gases contained in the passage 6.

9. Assembly according to claim 8, in which said means (9d, 9e) comprise a plurality of pairs of inclined staggered grooves (23e, 24e) facing each other and formed on the terminal part of the electrode (2) and on the inner wall of the precombustion chamber (1) in its closed rear part (1c).

10. Assembly according to claim 8, in which the facing grooves (20e, 21e) and (23e, 24e) forming a pair have different lengths and/or different inclinations from the axis of the precombustion chamber 1.

* * * * *